(12) United States Patent
Graham

(10) Patent No.: US 6,953,276 B2
(45) Date of Patent: Oct. 11, 2005

(54) ILLUMINATED DEVICE

(76) Inventor: Morton Graham, 5 Parkway, Westhoughton, Bolton, Lancashire BL5 2RY (GB)

(*) Notice: Subject to any disclaimer, the term of this patent is extended or adjusted under 35 U.S.C. 154(b) by 0 days.

(21) Appl. No.: 10/727,121

(22) Filed: Dec. 3, 2003

(65) Prior Publication Data

US 2004/0109307 A1 Jun. 10, 2004

Related U.S. Application Data

(63) Continuation of application No. PCT/GB02/02480, filed on Jun. 14, 2002.

(30) Foreign Application Priority Data

Jun. 14, 2001 (GB) ................................. 0114463

(51) Int. Cl.[7] ................................ F21V 7/04
(52) U.S. Cl. ....................... 362/605; 362/26; 362/23
(58) Field of Search ......................... 362/31, 27, 26, 362/23; 349/64, 65

(56) References Cited

U.S. PATENT DOCUMENTS 3,264,769 A    8/1966   Hardesty .................... 40/546
5,971,556 A  * 10/1999  Carter et al. ................. 362/23
6,606,133 B1 *  8/2003  Okabe ......................... 349/65
2003/0128538 A1 *  7/2003  Shinohara et al. ........... 362/31

FOREIGN PATENT DOCUMENTS

JP          2003036706 A  *  2/2003   ............. F21S/8/00

* cited by examiner

Primary Examiner—Thomas M. Sember
Assistant Examiner—James W Cranson, Jr.
(74) Attorney, Agent, or Firm—Gauthier & Connors LLP

(57) ABSTRACT

An illuminated device comprises a light source and an illumination plate, having a first face and a second face, separated by edges, and a diffusion cover, having an inner surface. The diffusion cover overlies the illumination plate and is shaped to form an enclosure defined by the inner surface and the first face. The light source delivers light into the illumination plate via the edges. The light undergoes scattering or primary diffusion within the plate, before emerging from the first face at shallow angles, into the enclosure. A reflective layer prevents light emerging from the second face. Within the enclosure, the light undergoes secondary diffusion to provide uniform illumination of the cover and a color, graphic or message superposed thereon.

15 Claims, 2 Drawing Sheets

ILLUMINATED DEVICE

This is a continuation of PCT/GB02/02480, filed Jun. 14, 2002.

The present invention relates to illuminated devices particularly to displays which provide architectural highlighting and illuminated backing for signs such as advertisements.

Illuminated displays in the form of edge-lit signs are well known and generally comprise a transparent plate having opposed first and second faces separated by an edge through which light is delivered thereinto. The light then undergoes internal reflection within the plate before emerging through the faces thereof.

Methods of modification of the plate to achieve this property include printing a matrix of white dots on the faces thereof, preferably concentrated towards the centre of the plate, which act to encourage light to emerge therethrough.

The present invention is concerned with an acrylic of the type which is modified to possess properties which encourage light to emerge through the faces. This material is often referred to as forward diffusing acrylic.

Molecules having a certain refractive index can be embedded in the acrylic plate. Using this type of acrylic, light is internally scattered as it interacts with the embedded particles within the plate. This changes the direction of propagation of the light so that it emerges uniformly at shallow angles from each face.

The display can be adapted to radiate light from one face only, by making the other face light-tight and reflective, thereby preventing the light escaping therefrom.

A diffusion cover in the form of a sheet of translucent material, having inner and outer surfaces, is laid on the, or each, face. This may carry a message, graphic and/or a colour.

Due to the shallow angle of the emerging light it collects at the boundary of the, or each, face and the diffusion cover, and illuminates the message, graphic and/or colour thereof.

It is desirable to obtain uniform illumination across the whole of the outer surface of the diffusion cover.

However, the diffusion cover cannot cover the entirety of each face of the plate as this reduces the uniformity of illumination around the periphery of its external surface area, which is undesirable. This necessitates the use of an opaque frame around the periphery of the face to mask the non-uniformity of light in that region, which in itself is an undesirable feature.

Furthermore, the need to have an illumination plate which is larger than the desired area of uniform illumination is a disadvantage of this type of display and is undesirable.

Additionally, attenuation of the light occurs within the plate as a function of distance from the light source and consequently the centre of the plate, and therefore of each face, appears darker.

It is an object of this invention to provide a uniformly illuminated device which overcomes the disadvantages of known constructions.

Furthermore, it is an object of this invention to provide an illuminated device comprising an illumination plate having boundaries which are equal to or smaller than those of the diffusion cover and consequently also providing the ability to produce a three dimensionally shaped display device having external surfaces capable of being uniformly illuminated.

According to the present invention an illuminated device comprises illumination means having at least one illumination plate, the, or each, plate comprising at least one face and at least one edge, and at least one light source adapted to deliver light into the, or each, illumination plate via the, or each, edge, and diffusion means comprising a cover having inner and outer surfaces; characterised in that the plate is a forward-diffusing acrylic material from the surface of which light emerges predominantly at an angle of less than 30° from the plane of the surface at the point of emergence; and in that the inner surface of the cover is disposed to overlie the, or each, face to form an enclosure, in which the, or each, face is disposed.

The angle of emergence may be less than 5°.

The illumination plate may have a second face disposed in an opposing direction to the said face and separated therefrom by the, or each, edge.

The boundary of the diffusion cover may be equal to, or larger, than the boundary of the illumination plate, or plates, which it overlies. Alternatively, or additionally, the area of the inner surface of the diffusion cover may be greater than the surface area of the face of the illumination plate which it overlies.

The, or each, edge of the, or each, illumination plate may be substantially perpendicular to at least one face.

The light source may comprise at least one light emitting diode adapted to deliver light into the, or each, illumination plate via at least one edge thereof.

Preferably, the, or each, illumination plate is substantially flat. However, alternatively, at least part of one, or more, illumination plates may be arcuate in shape.

The, or each, face may be adapted to prevent light being emitted therefrom. Preferably, this may be achieved using reflective means operable to reflect the light back into the respective illumination plate.

The cover may be a three dimensional shape and is preferably translucent and may be coloured and/or carry a message and/or a graphic on the outer surface. Alternatively, a message carrier and or graphic may overlie the diffusion cover.

At least part of the inner surface of the cover may be reflective.

The minimum distance between at least one of the first or second faces and the inner surface of the cover is preferably not less than 30 mm.

Embodiments of the present invention will be described further, by way of example, with reference to the accompanying drawings in which.

Figure 1:
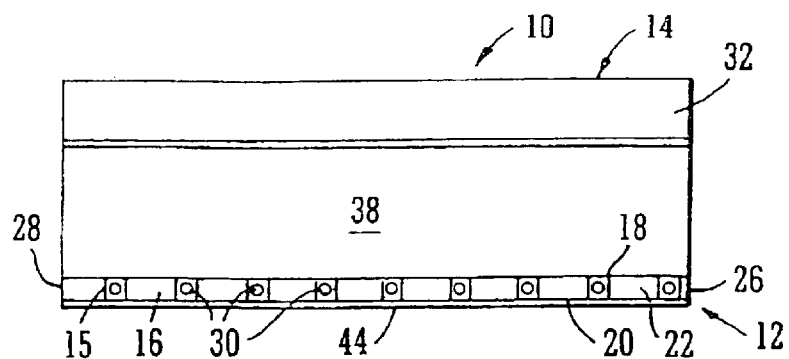
FIG. 1 is a schematic diagram of an illuminated display according to the present invention in a sectional side elevation along the line A—A shown in FIGS. 2 and 3.
Figure 2:
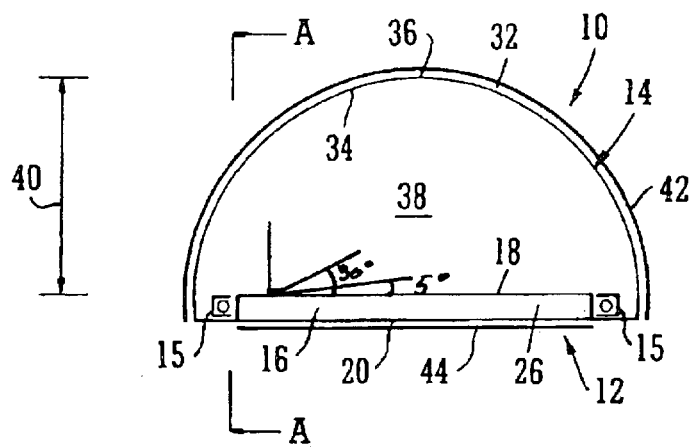
FIG. 2 is a schematic diagram showing the illuminated display of FIG. 1 in sectional elevation along the line B—B shown in FIG. 3.
Figure 3:
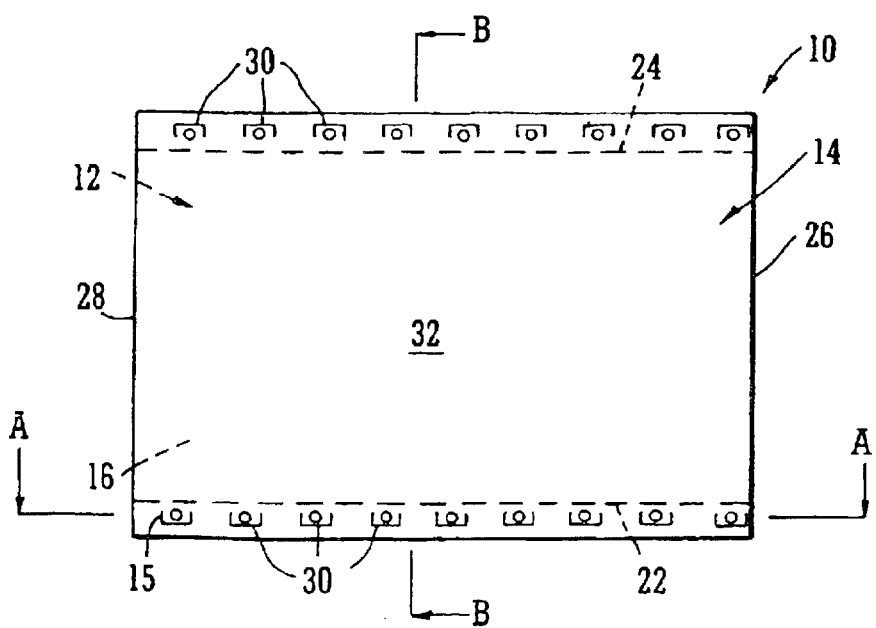
FIG. 3 is a schematic diagram showing a plan view of the illuminated display of FIGS. 1 and 2.

Referring to FIGS. 1 to 3 an illuminated display 10 comprises illumination means 12 and diffusion means 14.

The illumination means 12 comprises a light source 15 and an illumination plate 16 having a first face 18 and an opposed second face 20 separated by the thickness of the plate which typically may be some 10 mm or less to define longitudinal edges 22, 24 and transverse edges 26, 28 disposed perpendicular to, and about the periphery thereof.

However, it should be appreciated that in other embodiments of the invention the illumination plate may be circular, that is, having one edge, or may be of any shape and therefore may have any number of edges.

The illumination plate 16 is formed from acrylic adapted to have forward diffusing properties by embedding particles of different refractive index within the acrylic compound.

It should be appreciated that other transparent materials may also be used in other embodiments of the invention.

The light source 15 comprises a plurality of light emitting diodes 30 suitably disposed and suitably spaced so as to deliver light into the illumination plate 16 via the longitudinal edges 22, 24. In other embodiments of the invention the light source may comprise other sources of light, for example, fluorescent lighting.

The diffusion means 14 comprises a diffusion cover 32, formed from translucent material, having an inner surface 34 and an outer surface 36. The diffusion cover 32 overlies and completely encloses at least a part of the illumination plate 16 and is shaped to form an enclosure 38 defined by the inner surface 34 and the first face 18 of the illumination plate 16. Light cannot escape from the enclosure other than through the translucent wall of the cover.

The depth 40 of the enclosure 38 is optimally 300 mm, with the lower (side) edges some 30 mm from the edges of the plate 16. However, it should be appreciated that a greater depth may be acceptable, and may be proportional to the intensity of the light provided by the light source 15.

The diffusion cover may be of a particular colour or carry a graphic or message.

Alternatively, a transparent layer 42 may be superposed on the diffusion cover 32 to carry a graphic or message if required.

A reflective layer 44 is superposed on the second face 20 so as to prevent loss of light therethrough.

It should be appreciated that if the reflective layer 44 is not used, light can be emitted from both the first and second faces 18, 20. If this is desired, the diffusion cover 32 can be adapted to also overlie the second face 20 in the same manner as it does the first face 18.

In use, the light emitting diodes 30 deliver light into the illumination plate 16 via the longitudinal edges 22, 24. The light interacts with the embedded particles causing an initial diffusion within the boundaries of the illumination plate 16. This results in a change in direction of the propagation of the light so that it emerges through the first face 18 at shallow angles e.g. between less than 1° and 30° into the enclosure 38. The preferred angle is less than 5°.

As mentioned above, the light is prevented from being emitted from the second face 20 by the reflective layer 44.

In the enclosure 38 the light is contained and undergoes a secondary diffusion through interactions with gaseous molecules also contained in the enclosure. In the present embodiment the gas is air. The depth of the enclosure allows for sufficient diffusion to provide uniform illumination of the outer surface 36 of the diffusion cover 32 resulting in the uniform illumination of the colour, graphic or message thereon.

Figure 4:
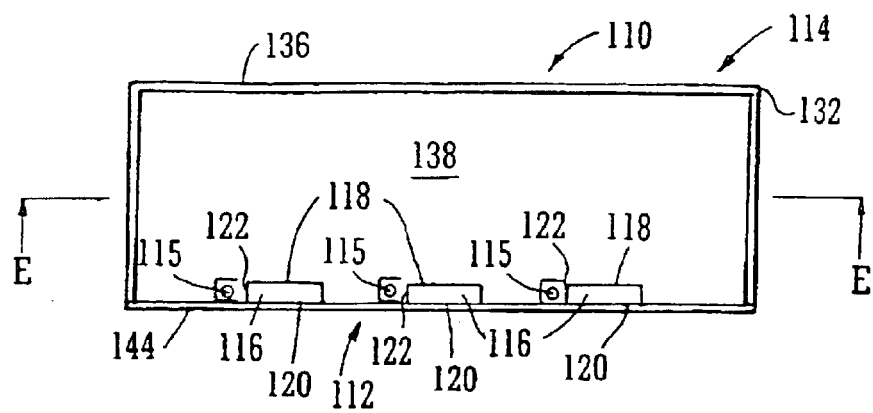
FIG. 4 is a schematic diagram of a second embodiment of an illuminated display according to the present invention in a sectional side elevation along the line C—C shown in FIG. 5.
Figure 5:
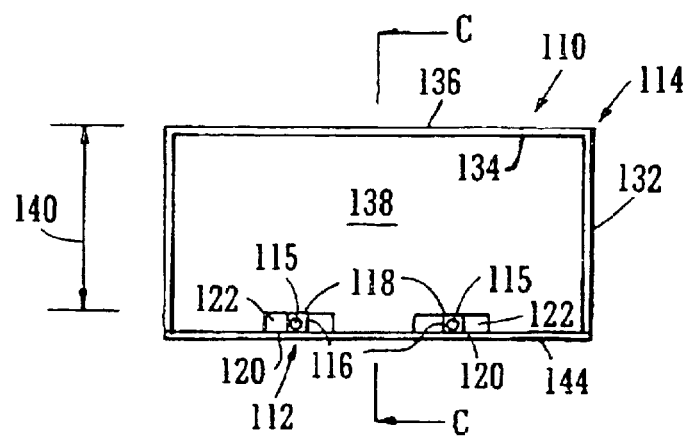
FIG. 5 is a schematic diagram of the illuminated display of FIG. 4 in sectional elevation along the line D—D shown in FIG. 6.
Figure 6:
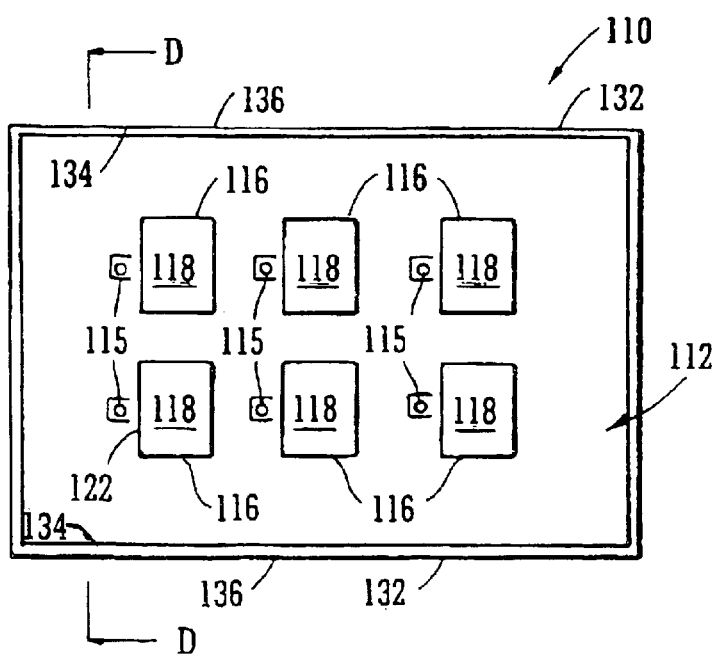
FIG. 6 is a schematic diagram of the illuminated display shown in FIGS. 4 and 5, showing a sectional plan along the line E—E shown in FIG. 4.

In FIGS. 4, 5 and 6 a second embodiment of the illuminated display 110 is shown and comprises illumination means 112 and diffusion means 114.

The illumination means comprises a plurality of illumination plates 116 each having an associated light source 114.

Each illumination plate 116 comprises a first face 118 and a second face 120 separated by an edge 122 perpendicular thereto.

A reflective layer 144 is superposed on the second face 120 to prevent light emerging therethrough.

The diffusion means 114 comprises a diffusion cover 132, formed from translucent material, having an inner surface 134 and an outer surface 136.

The diffusion cover 132 overlies and wholly contains the plurality of illumination plates 116 and is shaped to form an enclosure 138 defined by the inner surface 134 of the cover 132 and the first face 118 of each illumination plate 116.

The depth 140 of the enclosure is equal to that of the first embodiment as is the method of displaying a colour, graphic or message.

In use, a light source 115, for example a light emitting diode, delivers light into each illumination plate 116 via the edge 122 thereof.

The light experiences initial diffusion in each illumination plate 116, before emerging into the enclosure 138, at shallow angles, where it experiences secondary diffusion, as explained for the first embodiment above, before passing through the translucent diffusion cover 114 to illuminate uniformly the outer surface 136 thereof.

The use of a plurality of illumination plates 116 allows for the three dimensional illumination of shapes that would otherwise be difficult to illuminate uniformly, for example, letters and numerals.

An illuminated device of the kind described is capable of producing increased light output when compared with fluorescent and other conventional illumination means owing to the fact that the enclosed light generated by the light emitting diodes is completely diffused within the cover providing uniform illumination of a graphical message thereon.

In illuminated displays incorporating standard lighting such as fluorescent tubes, the illumination is beamed in concentrated areas onto the graphic or message thus producing, in effect, a corrugation of light where three or more high intensity illuminated areas are spaced apart by areas where the light level is low. Using the forward and secondary diffusion techniques of the present invention, a mean value of light right across the display is provided with a power saving of 50% or more. The reason for this is that where concentrated areas of light are generated in conventional displays it is necessary to include some form of diffuser to render the appearance more uniform, and this in turn reduces the light output thus requiring an increased light input to achieve the required visual illumination. The uniformity of illumination provided by the present invention avoids the need for any attenuation of the light and so a lower initial light input is acceptable thus again reducing the power requirement.

What is claimed is:

1. An illuminated device comprising illumination means having at least one illumination plate, the, or each, plate comprising at least one face and at least one edge, and at least one light source adapted to deliver light into the, or each, illumination plate via the, or each, edge, and diffusion means comprising a cover having inner and outer surfaces; characterized in that the plate is a forward-diffusing acrylic material from the surface of which light emerges predominantly at an angle of less than 30° from the plane of said at least one face at the point of emergence; and in that the inner surface of the cover is disposed to overlie said at least one face to form an enclosure, in which said at least one face is disposed.

2. An illuminated device as claimed in claim 1, wherein the light emerges from said at least one face of the plate at an angle of less than 5° from the plane of said at least one face at the point of emergence.

3. An illuminated device as claimed in claim 1, wherein the illumination plate comprises a second face disposed in an opposing direction to said at least one face and separated there-from by the, or each, edge and wherein at least one edge of the, or each, illumination plate is substantially perpendicular to said at least one face.

4. An illuminated device as claimed in claim 1, wherein the diffusion cover completely encloses the illumination plate or plates and wherein the boundary of the diffusion cover is equal to, or larger, than the boundary of the illumination plate, or plates, which it encloses.

5. An illuminated device as claimed in claim 1, wherein the the inner surface area of the diffusion cover is greater than the surface area of said at least one face of the illumination plate which it encloses.

6. An illuminated device as claimed in claim 1, wherein the minimum distance between said at least one face and the inner surface of the cover is at least 10 mm.

7. An illuminated device as claimed in claim 1, wherein the minimum distance between said at least one face and the inner surfaces of the cover is not less than 30 mm.

8. An illuminated device as claimed in claim 1, wherein the light source comprises at least one light emitting diode.

9. An illuminated device as claimed in claim 1, wherein the, or each, illumination plate is substantially flat.

10. An illuminated device as claimed in claim 1, wherein at least part of the, or each, illumination plate is arcuate in shape.

11. An illuminated device as claimed in claim 3, wherein the second face of the plate is adapted to prevent light emerging therefrom by reflective means to reflect the light back into the illumination plate.

12. An illuminated device as claimed in claim 1, wherein the cover is a three dimensional shape.

13. An illuminated device as claimed in claim 1, wherein at least one of a message, color or graphic, is displayed on the cover.

14. An illuminated device as claimed in claim 13, wherein said at least one of a message, color or graphic, is displayed on a light transmissive carrier which overlies the cover.

15. An illuminated device as claimed in claim 1, wherein at least part of the inner surface of the cover is reflective.

* * * * *